United States Patent [19]
Hogland

[11] 3,842,222
[45] Oct. 15, 1974

[54] IMPACT SENSOR ASSEMBLY
[75] Inventor: Keith C. Hogland, Plymouth, Mich.
[73] Assignee: Ford Motor Company, Dearborn, Mich.
[22] Filed: Feb. 28, 1973
[21] Appl. No.: 336,658

[52] U.S. Cl............. 200/61.44, 200/61.08, 180/91, 293/70, 188/1 C
[51] Int. Cl............................................ B60r 21/02
[58] Field of Search ........ 180/82 R, 91; 293/70, 85; 267/65 R; 200/61.44, 61.08; 188/1 C

[56] References Cited
UNITED STATES PATENTS

| 3,097,725 | 7/1963 | Peterson | 293/70 |
| 3,495,675 | 2/1970 | Hass et al. | 180/91 |
| 3,654,412 | 4/1972 | Haruna | 180/91 |
| 3,711,080 | 1/1973 | Kendall | 267/65 R |
| 3,715,114 | 2/1973 | Thorsby | 293/85 |
| 3,715,139 | 2/1973 | Tuggle | 293/85 X |
| 3,718,332 | 2/1973 | Jones | 293/70 |

Primary Examiner—Kenneth H. Betts
Assistant Examiner—Jack D. Rubenstein
Attorney, Agent, or Firm—John J. Roethel; Keith L. Zerschling

[57] ABSTRACT

An impact sensor assembly that becomes operative upon movement of a normally immovable component of an energy absorber apparatus that is subjected to an impact force as the result of a vehicle collision with a fixed object or another vehicle. The normally immovable component is anchored to a shearable means designed to shear under a predetermined load permitting movement of the component in a direction to crush a crushable switch causing the latter to close an actuating circuit.

1 Claim, 3 Drawing Figures

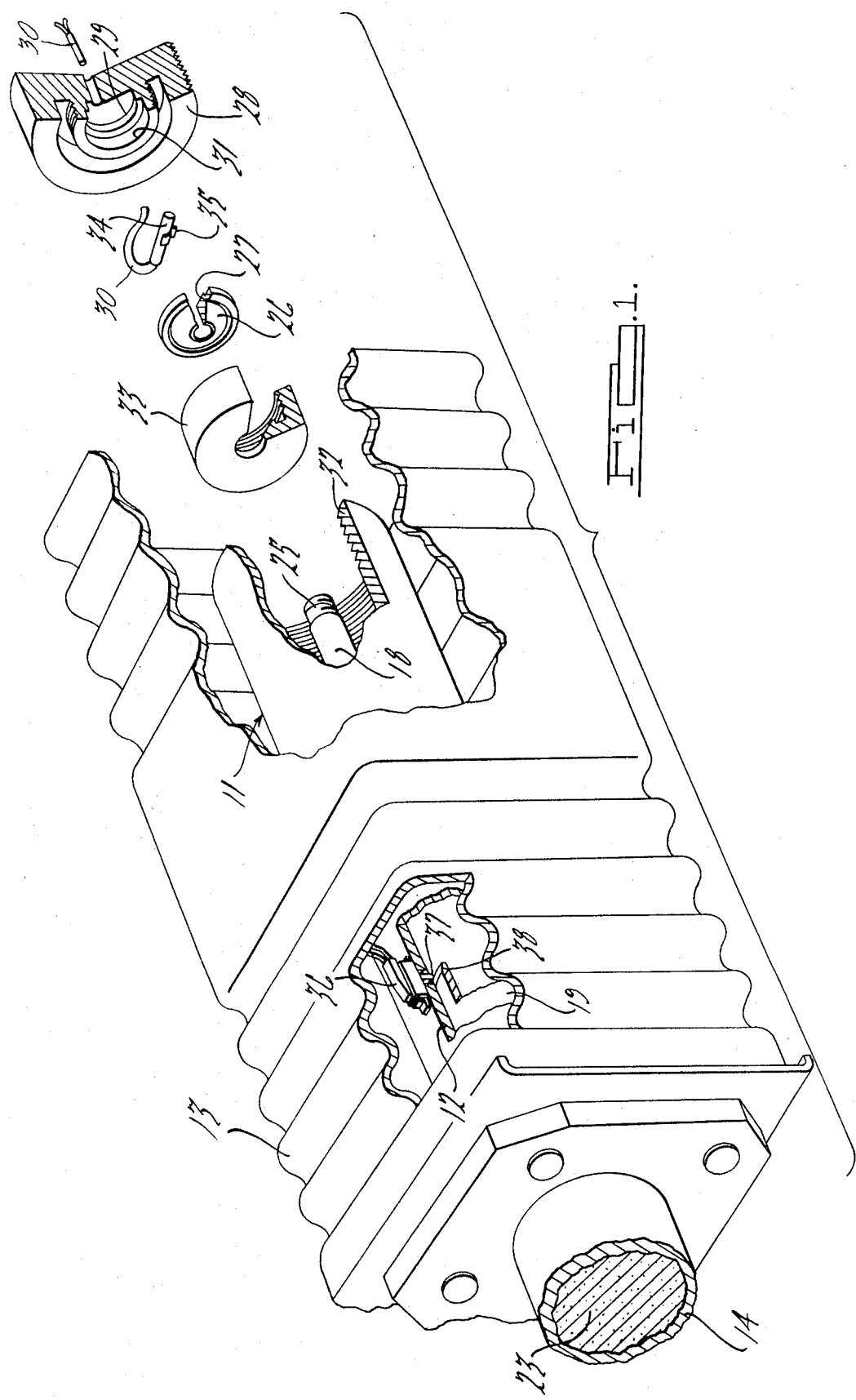

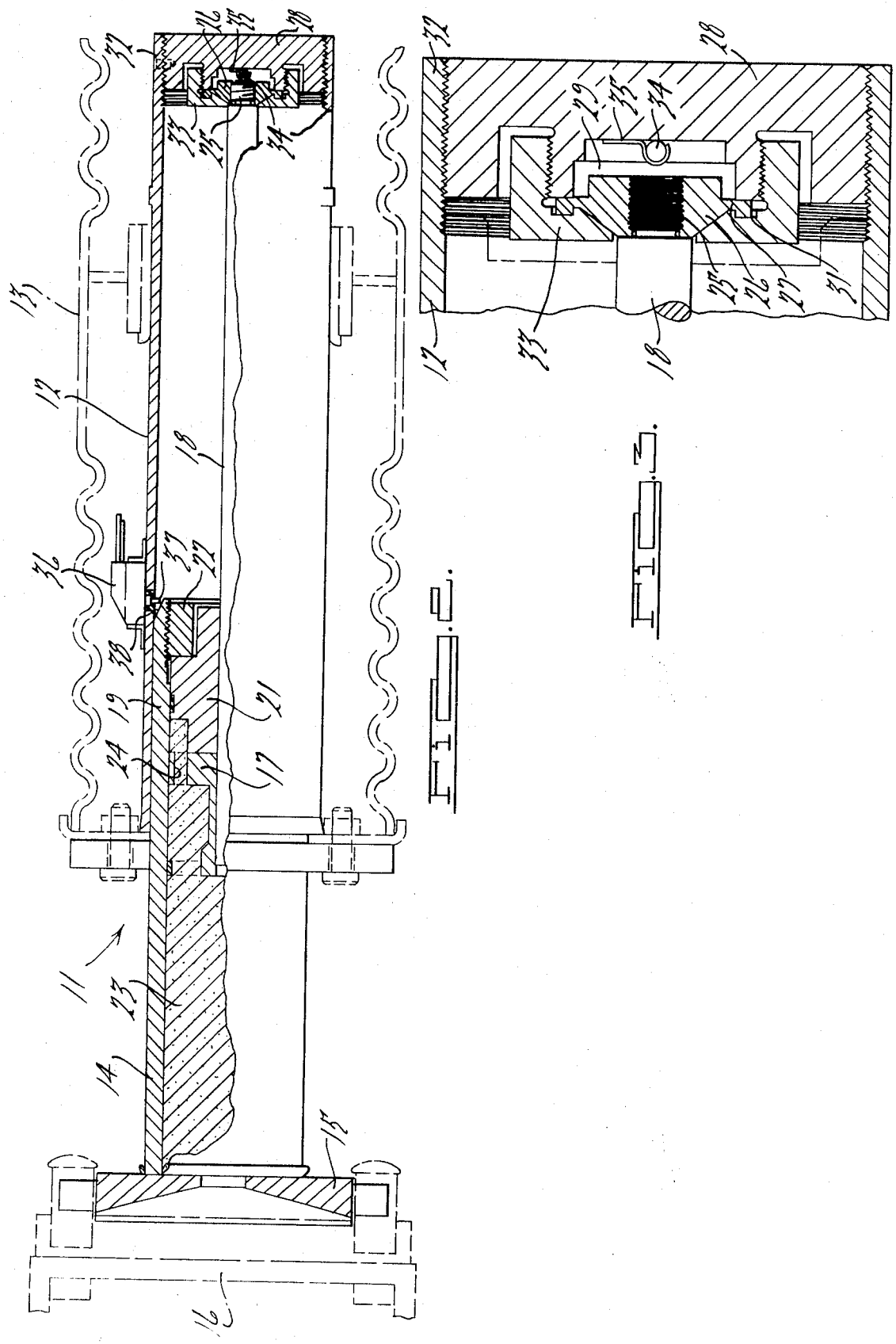

IMPACT SENSOR ASSEMBLY

BACKGROUND OF THE INVENTION

As disclosed in U.S. Pat. No. 3,495,675, issued Feb. 17, 1970 to David P. Hass et al. for "Vehicle Safety Method and Apparatus Using Expandable Confinement," a passenger restraint device, such as an airbag system, is actuated or triggered by sensing devices that sense the inertial and impact forces imposed on a vehicle under collision conditions. In general, the sensing devices comprise one or more acceleration or inertia operated electrical switches in series with one or more impact actuated electrical switches, the latter being responsive to impact induced movement of a vehicle structural member or a component of an energy absorbing apparatus such as used to support a vehicle bumper on the vehicle frame. Such an energy absorbing apparatus is exemplified by that disclosed in U.S. Pat. NO. 3,711,080 issued Jan. 16, 1973 to Giles A. Kendall for "Energy Absorbing Apparatus."

It is an object of the present invention to provide an impact sensor assembly that will be immune to accidental actuation by inertial or vibratory forces and which will cause electrical actuation only upon being subjected to an impact force of a predetermined value.

SUMMARY OF THE INVENTION

The present invention relates to an impact sensor assembly comprising a support member extending axially within a housing. The support member carries on one end a shearable means which is in abutting relation to a shearing means carried within the housing. The shearable means is adapted to be sheared by the shearing means upon axial movement of the support member within the housing in reaction to an impact force of a predetermined magnitude being applied to the support member. A crushable switch means is mounted in the path of movement of the shearable means and is adapted when crushed to close an actuating circuit.

DESCRIPTION OF THE DRAWING

Further features and advantages of the present invention will be made more apparent as this description proceeds, reference being had to the accompanying drawings, wherein:

FIG. 1 is a fragmentary, exploded, perspective view of a vehicle energy absorbing apparatus embodying an impact sensor assembly in accordance with the present invention;

FIG. 2 is a side elevational view in part sectional of the apparatus of FIG. 1, and FIG. 3 is an enlarged sectional view of the impact sensor assembly.

DETAILED DESCRIPTION OF THE INVENTION

With reference to the drawings, there is shown a vehicle energy absorption apparatus, generally designated 11, of a type more fully described in the aforementioned U.S. Pat. No. 3,711,080. The energy absorption apparatus 11, which may more simply be referred to as a bumper shock absorber, comprises a cylindrical or tubular housing 12 adapted to be anchored in one end of a vehicle frame member 13 indicated in dot-and-dash outline. Telescopically mounted within the housing 12 is a tubular strut 14 carrying a mounting flange 15 to which a vehicle bumper or the like 16 is adapted to be attached.

Within the end of the strut 14 is a piston 17 fixed on a piston rod 18 that extends longitudinally of the housing 12 and is anchored to the latter in a manner to be more fully described. The end 19 of the tubular strut 14 to the right of the piston 17 as viewed in FIG. 1 is sealed by a sealing plug 21 held within the strut by a cap screw 22. The chamber 23 of the tubular strut 14 is filled with a compressible solid material capable of passing from one side of the piston 17 through orifices or other passageways 24 upon an impact force being applied to the bumper 16 causing a telescopic movement of the strut 14 within the tubular housing 12.

As the bumper shock absorber is impacted at increasingly higher speeds, proportionately higher levels of force are transmitted to the piston rod 18. In accordance with the present invention, it is desired that the piston rod 18 remain immovable up to an impact speed of 16 miles per hour at which time the bumper shock absorber is utilized to trigger a vehicle compartment passive restraint system such as an air bag system.

As best seen in FIG. 3, the piston rod 18 threadedly receives on its end 25 a shear flange 26, i.e., the flange 26 has a reduced perimetrical cross section 27 which is designed to shear at a predetermined impact force. The shear flange 26 is in abutting relation to a die nut 28 having a counterbored recess 29 in one face. The edge 31 of the recess 29 provides the shear edge against which the shear flange shearable section 27 is positioned.

The die nut 28 is threaded into the end 32 of the tubular housing 14. The shear flange 26 is securely held on the die nut by a clamp nut 33. The geometry of the clamping nut 33 is such that it guarantees the positioning of the shear flange 26 and clamps it rigidly. It also is designed to prevent bending in both directions and to assist the shear section in towing or under bumper jacking loads.

A crushable switch 34 is held by a clamp 35 in the bottom of the recess 29 in the die nut 28. The switch 34 is axially aligned with the end 25 of the piston rod 18 and is suitably connected by lead 30 to an air bag system actuating device.

An additional switch 36 is shown mounted on the exterior surface of the tubular housing 12. The switch 36 has a plunger 37 aligned with a chamfer or taper 38 on the end 19 of the tubular strut 14.

OPERATION

Under low velocity impacts, the tubular strut 14 is adapted to move telescopically in and out of the tubular housing 12. The compressible solid material in the chamber 33 flows from one side of the piston 17 to the other and functions to restore the apparatus to its normal position after each impact. As the tubular strut 14 moves into the tubular housing 12, the switch 36 is actuated.

The switch 36 is a safety switch to protect the system against malfunction and it is not until the crush switch 34 is actuated that a crash sensor signal is transmitted to the air bag system or other passive restraint device to be actuated.

As noted above, the anchor means for the end 25 piston rod 18 is designed to resist impact forces up to a predetermined point. If it is desired that the air bag system be actuated at an impact velocity of 16 M.P.H. for a given size vehicle, the crash sensor device embodying the present invention is brought into play. The impact force on the piston rod 18 causes the die nut shear edge 31 to shear the shearable perimetrical cross section 27 of the shear flange 26. When rupture occurs, the piston rod assembly minus the sheared off portion moves axially and the shear flange 26 bottoms against the crushable switch 34 causing a closed electrical circuit and the flow of current to the air bag system detonators.

It is to be understood that the invention is not limited to the exact construction illustrated and described above, but that various changes and modifications may be made without departing from the spirit and scope of the invention defined by the following claims.

I claim:

1. A motor vehicle energy absorbing apparatus having a cylindrical housing adapted to be mounted on a vehicle frame member,
   a sleeve member telescopically slidable within the cylindrical housing from one end of the latter,
   a piston and piston rod assembly projecting into the sleeve,
   the piston being mounted on one end of the piston rod,
   passageways in the piston providing communication between both sides thereof,
   a compressible material located within the sleeve and capable of passing from one side to the other of the piston as the sleeve telescopes within the cylindrical housing under vehicle impact conditions,
   and anchor means fixedly coupling the piston and piston rod assembly to the other end of the cylindrical housing,
   characterized in that:
   the anchor means comprises a shearable flange member threadedly mounted on the other end of the piston rod,
   a shearing means comprising a die nut threadedly anchored in the housing in abutting relation to the shearable flange,
   the shearable flange member being coupled to the housing by being held on the die nut by a clamp nut,
   the shearable flange member being shearable by the shearing means and permitting axial movement of the piston and piston rod assembly relative to the housing in reaction to an impact force on the energy absorbing apparatus in excess of a predetermined value,
   and a crushable switch means mounted between the shearable flange member and a base portion of the die nut in the path of movement of the shearable flange member and adapted upon being crushed by the latter to close an actuating circuit.

* * * * *